(12) United States Patent
Yokoyama et al.

(10) Patent No.: US 8,728,342 B2
(45) Date of Patent: May 20, 2014

(54) CATHODE ACTIVE MATERIAL PLATE-LIKE PARTICLE FOR LITHIUM SECONDARY BATTERY

(75) Inventors: Shohei Yokoyama, Nagoya (JP);
Nobuyuki Kobayashi, Nagoya (JP);
Tsutomu Nanataki, Toyoake (JP);
Kouichi Kondou, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 267 days.

(21) Appl. No.: 13/235,662

(22) Filed: Sep. 19, 2011

(65) Prior Publication Data
US 2012/0085967 A1    Apr. 12, 2012

Related U.S. Application Data (60) Provisional application No. 61/391,124, filed on Oct. 8, 2010.

(30) Foreign Application Priority Data

Feb. 14, 2011   (JP) .................................. 2011-028150

(51) Int. Cl.
*H01M 4/88*   (2006.01)

(52) U.S. Cl.
USPC ..................... 252/182.1; 423/594.2; 428/402; 429/223

(58) Field of Classification Search
USPC ..................... 252/182.1; 423/594.2; 428/402; 429/223
See application file for complete search history.

(56) References Cited

U.S. PATENT DOCUMENTS

| | | | | |
|---|---|---|---|---|
| 5,503,930 | A * | 4/1996 | Maruyama et al. | 428/402 |
| 2004/0191161 | A1 * | 9/2004 | Wang et al. | 423/594.2 |

FOREIGN PATENT DOCUMENTS

| | | |
|---|---|---|
| JP | 09-022693 A1 | 1/1997 |
| JP | 2001-167761 A1 | 6/2001 |
| JP | 2003-168434 A1 | 6/2003 |
| JP | 2010-219064 A1 | 9/2010 |
| JP | 2010-219068 A1 | 9/2010 |
| JP | 2010-219069 A1 | 9/2010 |

* cited by examiner

*Primary Examiner* — Khanh Tuan Nguyen
(74) *Attorney, Agent, or Firm* — Burr & Brown, PLLC (57) ABSTRACT

An object of the present invention is to realize more effective intercalation and deintercalation of lithium ions in a cathode active material. The preset invention provides a cathode active material plate-like particle for a lithium secondary battery, the particle having a layered rock salt structure, wherein lithium-intercalation/deintercalation-plane-oriented grains (primary crystal grains whose (003) plane is oriented so as to intersect a plate surface of the plate-like particle) are present in a dispersed state among numerous (003)-plane-oriented grains (primary crystal grains whose (003) plane is oriented in parallel with the plate surface of the plate-like particle).

14 Claims, 2 Drawing Sheets

CATHODE ACTIVE MATERIAL PLATE-LIKE PARTICLE FOR LITHIUM SECONDARY BATTERY

BACKGROUND OF THE INVENTION

1. Field of the Invention

The present invention relates to a plate-like particle for cathode active material (hereinafter may be referred to as a "cathode active material plate-like particle") for a lithium secondary battery, the particle having a layered rock salt structure.

2. Description of the Related Art

Cathode active materials having a so-called $\alpha$-NaFeO$_2$ type layered rock salt structure are widely known as materials for producing a cathode of a lithium secondary battery (may be referred to as a "lithium ion secondary battery") (see, for example, Japanese Patent Application Laid-Open (kokai) Nos. H09-22693 and 2003-168434). In a cathode active material of this type, intercalation and deintercalation of lithium ions (Li$^+$) occur through a crystal plane other than the (003) plane (e.g., the (101) plane or the (104) plane; hereinafter such a plane may be referred to as a "lithium ion intercalation/deintercalation plane"). Through such intercalation and deintercalation of lithium ions, charge and discharge are carried out.

SUMMARY OF THE INVENTION

For improvement of characteristics of a battery of this type, more effective intercalation and deintercalation of lithium ions must be caused to occur in a cathode active material. The present invention has been accomplished in view of the foregoing.

Configuration

The present invention is directed to a "cathode active material plate-like particle for a lithium secondary battery" (hereinafter may optionally be referred to simply as "plate-like particle" or "cathode active material particle"), the particle being in a polycrystalline form composed of numerous primary crystal grains having a layered rock salt structure. For example, the cathode active material particle has a composition represented by the following formula:

$$Li_p(Ni_x, Co_y, M_z)O_2$$

[wherein M is at least one species selected from the group consisting of Al, Mn, and Mg; $0.9 \leq p \leq 1.3$ and $x+y+z=1$].

As used herein, "layered rock salt structure" of the "cathode active material plate-like particle for a lithium secondary battery" of the present invention refers to a crystal structure in which lithium layers and layers of a transition metal other than lithium are arranged in alternating layers with an oxygen layer therebetween; i.e., a crystal structure in which transition metal ion layers and lithium layers are arranged in alternating layers via oxide ions (typically, $\alpha$-NaFeO$_2$ type structure: cubic rock salt type structure in which transition metal and lithium are arrayed orderly in the direction of the [111] axis). As used herein, the term "primary crystal grain" refers to a crystal grain having the aforementioned layered rock salt structure and having no crystal grain boundaries therein.

A characteristic feature of the cathode active material particle of the present invention resides in that the particle satisfies the following:

t $\leq$ 30 µm and d/t $\geq$ 2;
lithium-intercalation/deintercalation-plane-oriented grains are present in a dispersed state among numerous (003)-plane-oriented grains; and
the peak intensity ratio [003]/[104] is 10 to 100.

As used herein, "t" represents the thickness of the cathode active material particle; "d" represents the size of the particle (size as measured in a plate surface direction (i.e., orthogonal to a thickness direction)); and "d/t" represents an aspect ratio. As used herein, the term "plate-like particle" refers to a particle having an aspect ratio of 2 or more. In terms of handling ability (for example, morphological stability of particles at the time of slurry preparation and film formation), the aspect ratio is preferably falls within the range of 2 to 5, more preferably within the range of 3 to 5.

The aforementioned "lithium-intercalation/deintercalation-plane-oriented grains" are primary crystal grains whose (003) plane is oriented so as to intersect the plate surface of the plate-like particle. The aforementioned "(003)-plane-oriented grains" are primary crystal grains whose (003) plane is oriented in parallel with the plate surface of the plate-like particle.

The term "thickness direction" refers to the direction which defines the "thickness" t of the cathode active material particle; typically, a direction parallel with the vertical direction in a state in which the cathode active material plate-like particle is placed stably on a horizontal surface. The term "thickness" refers to the size of the cathode active material particle as measured in the "thickness direction."

The term "plate surface" refers to a surface of the cathode active material particle which is generally orthogonal to the "thickness direction" of the particle. Since the "plate surface" of the cathode active material particle is the widest surface on the particle, the "plate surface" may be referred to as the "principal surface." The term "plate surface direction" refers to a direction parallel with the "plate surface" (i.e., in-plane direction). In contrast, the term "end surface" refers to a surface of the cathode active material particle which is generally orthogonal to the "plate surface" and which is exposed at an edge of the particle in the plate surface direction.

Therefore, the "thickness" of the cathode active material particle is the shortest distance between the two "plate surfaces" of the particle which are generally parallel with each other and which have normal vectors pointing in generally opposite directions. Specifically, the thickness t of the cathode active material particle is determined by, for example, measuring the distance between the generally parallel plate surfaces of the particle as observed in cross section under an SEM (scanning electron microscope). The aforementioned "thickness direction" is the direction which defines the shortest distance between the two "plate surfaces."

The peak intensity ratio [003]/[104] is a parameter indicating the degree of orientation in the cathode active material particle; specifically, the ratio of intensity of diffraction by the (003) plane to intensity of diffraction by the (104) plane, as obtained through X-ray diffractometry. As is clear from these definitions and the above-described characteristic feature, the cathode active material particle of the present invention is formed such that the (003) plane is exposed over a large portion of the plate surface of the particle, and the aforementioned lithium ion intercalation/deintercalation plane (e.g., the (104) plane) is exposed (in a dispersed state) over a small portion of the plate surface.

Regarding the dispersed state of lithium-intercalation/deintercalation-plane-oriented grains in the plate surface direction of the cathode active material particle, when the proportion of lithium-intercalation/deintercalation-planeoriented grains at the plate surface of the plate-like particle is determined in 10 visual fields, each containing 100 to 200 primary crystal grains, by means of an electron backscatter diffractometer (EBSD), the standard deviation of the thus-determined proportions is preferably 15 or less (more preferably 10 or less).

Regarding the dispersed state of lithium-intercalation/deintercalation-plane-oriented grains in the cross-sectional direction of the cathode active material particle, when the proportion of lithium-intercalation/deintercalation-plane-oriented grains at a cross section orthogonal to the plate surface of the plate-like particle is determined in 10 visual fields, each containing 100 to 200 primary crystal grains, by means of the aforementioned EBSD, the standard deviation of the thus-determined proportions is preferably 15 or less (more preferably 10 or less).

In case of $0.6<x<0.8$, $0.01<y\leq0.4$ and $0\leq z\leq0.3$ in the formula, the aforementioned primary crystal grains preferably have a grain size of t/100 or more and 5 µm or less. Alternatively, in case of $0.8\leq x\leq0.95$, $0.01<y\leq0.2$ and $0\leq z\leq0.2$ in the formula, the aforementioned primary crystal grains preferably have a grain size of t/100 or more and 10 µm or less. Meanwhile, in both cases, the aforementioned primary crystal grains preferably have a grain size of 0.8 µm or more, more preferably have a grain size of 1 µm or more.

A lithium secondary battery employing the cathode active material particles includes a cathode containing a cathode active material layer formed by dispersing the cathode active material particles in a specific binder; an anode containing a carbonaceous material or a lithium-occluding material as an anode active material; and an electrolyte interposed between the cathode and the anode. Specifically, the cathode is formed by, for example, stacking the aforementioned cathode active material layer with a specific cathode collector.

Effects

In the cathode active material particle of the present invention having the aforementioned configuration, the (003) plane (i.e., a plane through which intercalation and deintercalation of lithium ions does not occur) is exposed over a large portion of the plate surface, and the aforementioned lithium ion intercalation/deintercalation plane is exposed to the outside of the particle (i.e., the aforementioned electrolyte) over a small portion of the plate surface (portion of the plate surface where the lithium-intercalation/deintercalation-plane-oriented grains are exposed to the outside) and at the end surface. That is, the aforementioned lithium ion intercalation/deintercalation plane is distributed on the plate surface so as to correspond to the dispersed state of the lithium-intercalation/deintercalation-plane-oriented grains.

Each of the lithium-intercalation/deintercalation-plane-oriented grains exposed at the plate surface functions as a lithium ion path between the aforementioned electrolyte and a (003)-plane-oriented grain adjacent to the lithium-intercalation/deintercalation-plane-oriented grain along the aforementioned plate surface direction. Similarly, each of the lithium-intercalation/deintercalation-plane-oriented grains present in the cathode active material particle functions as a lithium ion path for releasing lithium ions, to the aforementioned electrolyte outside of the particle, from a (003)-plane-oriented grain adjacent to the lithium-intercalation/deintercalation-plane-oriented grain along the aforementioned plate surface direction, and from the electrolyte to the (003)-plane-oriented grain.

Thus, according to the cathode active material particle of the present invention, favorable durability (cycle characteristic) is secured by exposing the (003) plane, which is a physically and chemically stable plane, over a large portion of the plate surface, and favorable charge-discharge characteristic (rate characteristic) is realized by effectively exposing the aforementioned lithium ion intercalation/deintercalation plane to the outside of the particle (i.e., the aforementioned electrolyte).

DESCRIPTION OF THE INVENTION

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law.

Thus, as will be described later, naturally, the present invention is not limited to the specific configurations of embodiments and examples to be described below. Modifications that can be made to the embodiments and examples are collectively described herein at the end to a maximum possible extent, since insertion thereof into the description of the embodiments would disturb understanding of consistent description of the embodiments.

1. Configuration of Lithium Secondary Battery

Figure 1A:
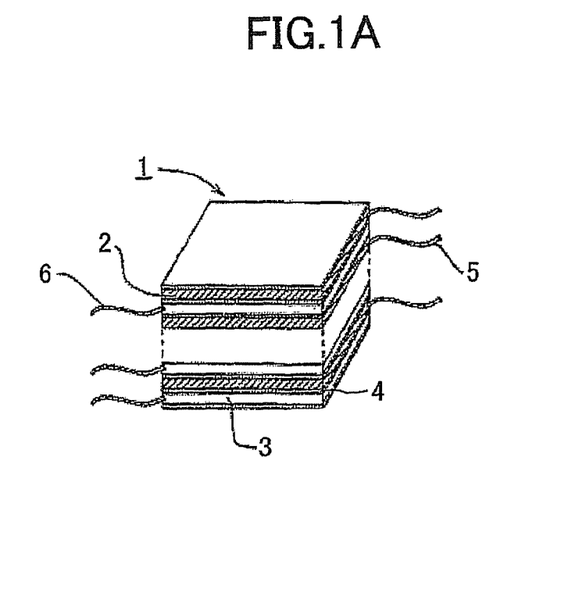
FIG. 1A is a sectional view of the schematic configuration of an exemplary lithium secondary battery to which one embodiment of the present invention is applied.

FIG. 1A is a sectional view of the schematic configuration of an exemplary lithium secondary battery 1 to which one embodiment of the present invention is applied. Referring to FIG. 1A, the lithium secondary battery 1 is a so-called liquid-type battery and includes cathode plates 2, anode plates 3, separators 4, cathode tabs 5, and anode tabs 6.

The separator 4 is provided between the cathode plate 2 and the anode plate 3. That is, the cathode plate 2, the separator 4, and the anode plate 3 are stacked in this order. The cathode tabs 5 are electrically connected to the respective cathode plates 2. Similarly, the anode tabs 6 are electrically connected to the respective anode plates 3.

The lithium secondary battery 1 shown in FIG. 1A is configured such that a stack of the cathode plates 2, the separators 4, and the anode plates 3, and an electrolytic solution containing a lithium compound as an electrolyte are liquid-tightly sealed in a specific cell casing (not illustrated).

Figure 1B:
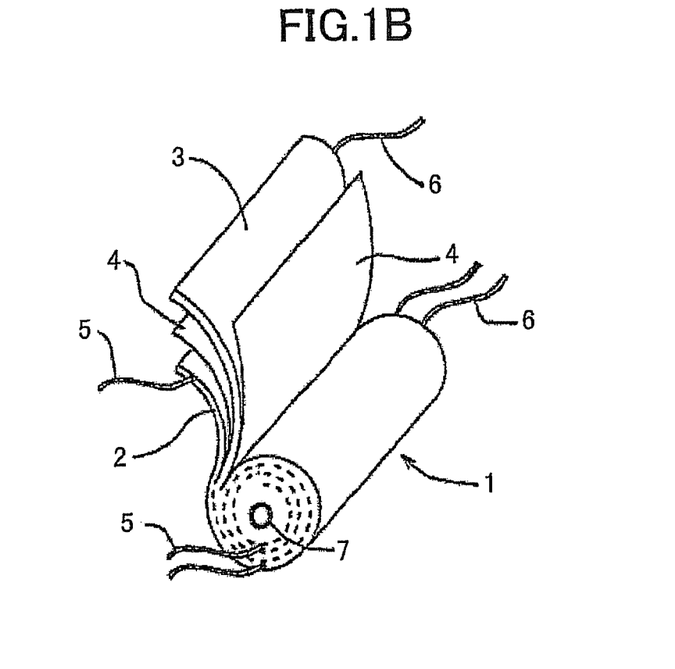
FIG. 1B is a perspective view of the schematic configuration of another exemplary lithium secondary battery to which one embodiment of the present invention is applied.

FIG. 1B is a perspective view of the schematic configuration of another exemplary lithium secondary battery 1 to which one embodiment of the present invention is applied. Referring to FIG. 1A, this lithium secondary battery 1 is also a liquid-type battery and includes a cathode plate 2, an anode plate 3, separators 4, cathode tabs 5, anode tabs 6, and a core 7.

The lithium secondary battery 1 shown in FIG. 1B is configured such that an internal electrode body formed through winding, onto the core 7, of a stack of the cathode plate 2, the separators 4, and the anode plate 3, and the aforementioned electrolytic solution are liquid-tightly sealed in a specific cell casing (not illustrated).

Figure 2A:
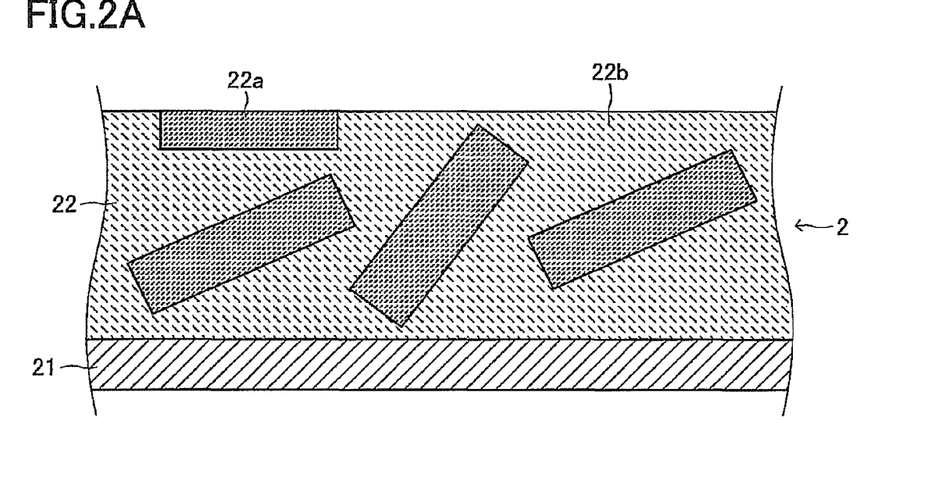
FIG. 2A is an enlarged sectional view of the cathode plate shown in FIG. 1A or 1B.

FIG. 2A is an enlarged sectional view of the cathode plate 2 shown in FIG. 1A or 1B. Referring to FIG. 2A, the cathode plate 2 includes a cathode collector 21 and a cathode layer 22. The cathode layer 22 is configured such that cathode active material particles 22a are dispersed in a binder 22b.

2. Details of Configuration of Cathode Active Material Particle

Each of the cathode active material particles 22a is a plate-like particle of lithium nickelate having a composition represented by the following formula and a layered rock salt structure, and the particle is formed so as to have a thickness of 30 μm or less and an aspect ratio of 3 or more:

[wherein M is at least one species selected from the group consisting of Al, Mn, and Mg; 0.9≤p≤1.3 and x+y+z=1].

Figure 2B:
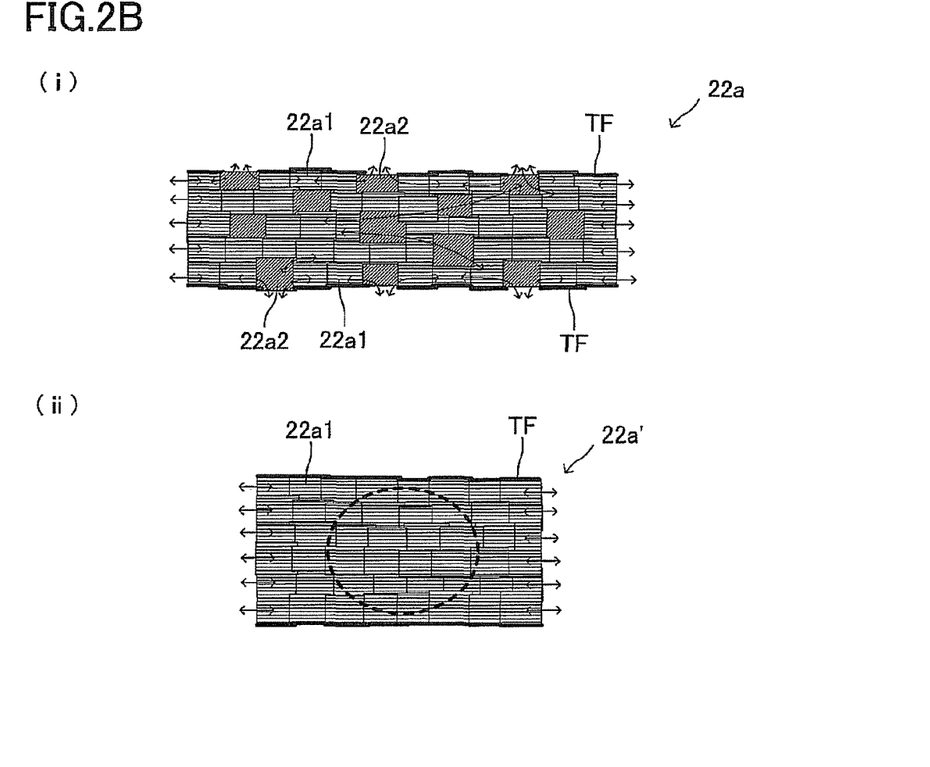
FIG. 2B is enlarged sectional views of a cathode active material particle shown in FIG. 2A and a cathode active material particle of Comparative Example.

FIG. 2B is enlarged sectional views of the cathode active material particle 22a shown in FIG. 2A and a cathode active material particle 22a' of Comparative Example. As shown in FIG. 2B(i), the cathode active material particle 22a of the present embodiment is in a polycrystalline form composed of numerous primary crystal grains having a layered rock salt structure (i.e., (003)-plane-oriented grains 22a1 and lithium-intercalation/deintercalation-plane-oriented grains 22a2). Particularly, the cathode active material particle 22a of the present embodiment is formed such that lithium-intercalation/deintercalation-plane-oriented grains 22a2 are present in a well dispersed state among numerous (003)-plane-oriented grains 22a1, and the peak intensity ratio [003]/[104] is 10 to 100.

The (003)-plane-oriented grains 22a1 are primary crystal grains whose (003) plane (indicated by bold lines on a plane surface) is oriented in parallel with the plate surface TF of the cathode active material particle 22a. The lithium-intercalation/deintercalation-plane-oriented grains 22a2 are primary crystal grains whose (003) plane is oriented so as to intersect the plate surface TF of the cathode active material particle 22a (e.g., (104)-plane-oriented grains).

The cathode active material particle 22a of the present embodiment is formed such that the grain size of the primary crystal grains (the (003)-plane-oriented grains 22a1 and the lithium-intercalation/deintercalation-plane-oriented grains 22a2) is (1) 1/100 of the thickness of the cathode active material particle 22a or more and 5 μm or less in case of 0.6<x<0.8, 0.01<y≤0.4 and 0≤z≤0.3 in the formula, (2) 1/100 of the thickness of the cathode active material particle 22a or more and 10 μm or less in case of 0.8≤x≤0.95, 0.01<y≤0.2 and 0≤z≤0.2 in the formula.

3. Effect of the Configuration of Cathode Active Material Particle of the Embodiment As shown in FIG. 2B(i), in the cathode active material particle 22a of the present embodiment, the (003) plane is exposed over a large portion of the plate surface TF, and the lithium ion intercalation/deintercalation plane is exposed to the outside of the particle (i.e., electrolyte) over a small portion of the plate surface TF (portion of the plate surface TF where the lithium-intercalation/deintercalation-plane-oriented grains 22a2 are exposed to the outside) and at the end surface. That is, the lithium ion intercalation/deintercalation plane is distributed on the plate surface TF so as to correspond to the dispersed state of the lithium-intercalation/deintercalation-plane-oriented grains 22a2.

Thus, the cathode active material particle 22a of the present embodiment is a plate-like particle having an aspect ratio of more than 2 in which the (003)-plane-oriented grains are appropriately exposed so that the lithium ion intercalation/deintercalation plane is appropriately exposed at the surfaces (including the plate surface TF and the end surface). The (003) plane is physically and chemically stable (i.e., high strength and low reactivity with an electrolytic solution). Therefore, the cathode active material particle 22a of the present embodiment appropriately has, on the surface thereof, the lithium ion intercalation/deintercalation plane, and exhibits high resistance to impact between particles or to reaction with an electrolytic solution.

As shown by arrows in FIG. 2B(i), each of the lithium-intercalation/deintercalation-plane-oriented grains 22a2 exposed at the plate surface TF functions as a lithium ion path between the electrolyte and a (003)-plane-oriented grain 22a1 adjacent to the grain 22a2 along the plate surface direction. Similarly, each of the lithium-intercalation/deintercalation-plane-oriented grains 22a2 present in the cathode active material particle functions as a lithium ion path for releasing lithium ions, to the electrolyte outside of the particle, from a (003)-plane-oriented grain 22a1 adjacent to the grain 22a2 along the plate surface direction, and from the electrolyte to the (003)-plane-oriented grain 22a1.

Thus, according to the cathode active material particle 22a of the present embodiment, favorable durability (cycle characteristic) is secured by exposing the (003) plane, which is a physically and chemically stable plane, over a large portion of the plate surface TF, and favorable charge-discharge characteristic (rate characteristic) is realized by effectively exposing the lithium ion intercalation/deintercalation plane to the outside of the particle (i.e., the electrolyte).

The cathode active material particle 22a' shown in FIG. 2B(ii) exhibits excessively high degree of (003) plane orientation, and thus includes therein a region through which intercalation and deintercalation of lithium ions are less likely to occur (see the broken-line ellipse in FIG. 2B(ii)). In such a particle, favorable cycle characteristic is obtained, but favorable rate characteristic fails to be attained. In contrast, the cathode active material particle 22a of the present embodiment exhibits improved cycle characteristic and rate characteristic, which have conventionally been in a trade-off relationship as described above.

The cathode active material particle 22a of the present embodiment is formed to have a plate-like shape having specific thickness and aspect ratio such that the diffusion distance of lithium ions is reduced to a minimum possible extent. In addition, in the cathode active material particle 22a, the primary crystal grains have such an appropriate size that crystal grain boundaries, which may resist diffusion of lithium ions, are reduced to a minimum possible level. Thus, cycle characteristic can be improved without deterioration of rate characteristic.

As shown in FIG. 2B(ii), when the thickness of the cathode active material particle is excessively large (specifically, greater than 30 μm), the diffusion distance of lithium ions increases, and rate characteristic is lowered. When the aspect ratio is excessively low (specifically, less than 2) under such a thickness condition, the (003) plane is exposed over a smaller portion, and thus cycle characteristic is likely to be lowered due to reaction of the particle with an electrolytic solution.

Regarding the degree of orientation, when the peak intensity ratio [003]/[104] is excessively high (specifically, greater than 100), the lithium ion intercalation/deintercalation plane is exposed over an excessively small portion of the surface of the cathode active material particle, resulting in deterioration of rate characteristic, whereas when the peak intensity ratio [003]/[104] is excessively low (specifically, less than 10), the (003) plane, which is a physically and chemically stable plane, is exposed over an excessively small portion of the surface of the cathode active material particle, resulting in lowering of the effect of improving cycle characteristic in association with an increase in degree of (003) plane orientation (i.e., the effect of reducing internal stress associated with suppression of impact between cathode active material particles, or the effect of suppressing reaction between the particles and an electrolytic solution).

4. Specific Examples of Cathode Active Material Particle of the Embodiment

Next will be described specific examples of the method for producing the cathode active material particles 22a of the present embodiment, and the results of evaluation of the particles.

4-1. Specific Example of Production Method (1) Preparation of Slurry $Ni(OH)_2$ powder (product of Kojundo Chemical Laboratory Co., Ltd.), $Co(OH)_2$ powder (product of Kojundo Chemical Laboratory Co., Ltd.), $Al_2O_3 \cdot H_2O$ (product of SASOL), and $LiOH \cdot H_2O$ powder (product of Wako Pure Chemical Industries, Ltd.) were pulverized and mixed together by means of a ball mill for 16 hours so as to attain a mixture composition of $Li_{1.1}(Ni_{0.75}Co_{0.2}Al_{0.05})O_2$. The resultant raw material powder (100 parts by weight) was mixed with a dispersion medium (toluene:isopropanol=1:1) (100 parts by weight), a binder (polyvinyl butyral: product No. BM-2, product of Sekisui Chemical Co., Ltd.) (10 parts by weight), a plasticizer (DOP: di(2-ethylhexyl) phthalate, product of Kurogane Kasei Co., Ltd.) (4 parts by weight), and a dispersant (trade name: RHEODOL SP-O30, product of Kao Corporation) (2 parts by weight).

The resultant mixture was stirred under reduced pressure for defoaming, and the viscosity thereof was adjusted to 3,000 to 4,000 cP (the viscosity was measured by means of an LVT-type viscometer (product of Brookfield Co., Ltd.)).

(2) Sheet Forming

The thus-prepared slurry was formed into a sheet-like compact on a PET film through the doctor blade method (feed rate: 1 m/s) so that the thickness of the compact as measured after drying was adjusted to 12 μm.

(3) Thermal Treatment

The sheet-like compact was removed from the PET film and placed at the center of a zirconia-made setter. The compact was thermally treated in an oxygen atmosphere (oxygen partial pressure: 0.1 MPa) at 775° C. for 24 hours, to thereby produce an "independent" $Li_{1.0}(Ni_{0.75}Co_{0.2}Al_{0.05})O_2$ ceramic sheet for a cathode active material layer.

(4) Crushing

The thus-fired ceramic sheet was placed on a mesh having an opening diameter of 50 μm, and then a spatula was lightly pressed against the ceramic sheet so as to cause the ceramic sheet to pass through the mesh for crushing, to thereby produce cathode active material plate-like particles.

4-2. Evaluation Methods

Next will be described evaluation methods for cathode active material plate-like particles of Experimental Examples 1 to 8 and Comparative Examples 1 to 5 produced under appropriately modified conditions of the production method of the aforementioned example (see the below-described Table 1: the aforementioned example corresponds to "Experimental Example 2").

(1) Particle Form (Primary Grain Size, Thickness, and Aspect Ratio)

An SEM image of a surface of a cathode active material plate-like particle (secondary grain) parallel to the plate surface thereof was captured at such a magnification that a visual field includes 10 or more primary grains. An inscribed circle was drawn in each primary grain, and the diameter of the circle was measured. The average of the thus-determined diameters was regarded as primary grain size. An SEM image was captured at such a magnification that a visual field includes 10 or more cathode active material plate-like particles (secondary grains), and the longitudinal size of the cathode active material plate-like particles was determined in a manner similar to that described above. Subsequently, an SEM image of a cross section of a cathode active material plate-like particle perpendicular to the plate surface thereof was captured, and the vertical length of the particle was measured. This procedure was performed on 10 different cathode active material plate-like particles, and the average of the thus-measured vertical lengths was regarded as the thickness of the cathode active material plate-like particles. The value obtained by dividing the longitudinal size by the thickness was regarded as the aspect ratio of the cathode active material plate-like particles.

(2) Orientation Degree

A mixture prepared by adding cathode active material plate-like particles (0.1 g) to ethanol (2 g) was subjected to dispersion for 30 minutes by means of an ultrasonic disperser (ultrasonic cleaner), and the resultant dispersion liquid was spin-coated at 2,000 rpm onto a glass substrate (25 mm×50 mm) so as to prevent overlap of the cathode active material plate-like particles to the greatest possible extent and to bring crystal planes in parallel with the glass substrate surface.

By means of an X-ray diffraction apparatus (GEIGER FLEX RAD-IB, product of Rigaku Corporation), the surfaces of the cathode active material plate-like particles were irradiated with X-rays so as to measure an XRD (X-ray diffraction) profile, to thereby obtain the ratio of intensity (peak height) of diffraction by the (003) plane to intensity (peak height) of diffraction by the (104) plane (i.e., [003]/[104]). In the aforementioned method, the plate surfaces of the cathode active material plate-like particles are in surface contact with the glass substrate surface, so that the particle plate surface is in parallel with the glass substrate surface. Thus, according to the aforementioned method, there is obtained a profile of diffraction by crystal planes present in parallel with the crystal planes of the particle plate surface; i.e., a profile of diffraction by crystal planes oriented in a plate surface direction of the particles.

(3) Dispersed State

In a manner similar to that of the above-described XRD measurement, cathode active material plate-like particles were placed on a glass substrate so as to prevent overlap of the cathode active material plate-like particles to the greatest possible extent and to bring crystal planes in parallel with the glass substrate surface. The particles were transferred onto an adhesive tape, and the tape was impregnated with a resin. The resin-impregnated tape was polished so as to observe the polished plate surfaces or cross-sectional surfaces of the cathode active material plate-like particles. In the case of observation of the plate surfaces, final polishing was carried out by means of a vibration-type rotary polisher employing colloidal silica (0.05 μm) as an abrasive. In the case of observation of the cross-sectional surfaces, final polishing was carried out by means of a cross section polisher (CP).

The thus-prepared sample was subjected to electron backscatter diffractometry (EBSD) in a visual field containing 100 to 200 primary grains for analysis of the crystal orientation of each grain, to thereby determine the proportion of grains whose (003) plane is inclined by 10° or more with respect to the plate surface direction of the cathode active material plate-like particles. This procedure was performed in 10 different visual fields, and the standard deviation of the thus-determined grain proportions was calculated. The smaller the standard deviation, the more uniform the dispersion of lithium-intercalation/deintercalation-plane-oriented grains $22a2$.

(4) Cell Characteristics

For evaluation of cell characteristics, a cell was fabricated in the following manner.

The above-obtained $Li_{1.0}(Ni_{0.75}Co_{0.2}Al_{0.05})O_2$ particles, acetylene black, and polyvinylidene fluoride (PVDF) were mixed in proportions by mass of 75:20:5, to thereby prepare a cathode material. The thus-prepared cathode material (0.02 g) was pressed into a disk-like compact having a diameter of 20 mm under a pressure of 300 kg/cm$^2$, to thereby form a cathode.

The thus-formed cathode, an anode formed of a lithium metal plate, stainless steel collector plates, and a separator were arranged in the order of collector plate—cathode—separator—anode—collector plate. The resultant stacked product was filled with an electrolytic solution, to thereby produce a coin cell. The electrolytic solution was prepared by dissolving $LiPF_6$ in an equivolume mixture of ethylene carbonate (EC) and diethyl carbonate (DEC) serving as an organic solvent to a concentration of 1 mol/L.

The thus-fabricated coin cell was evaluated in terms of rate characteristic (percent rate capacity maintenance) and cycle characteristic (percent cycle capacity maintenance).

(4-1) Rate Characteristic

The above-fabricated cell was evaluated as follows. One cycle consists of the following charge and discharge operations: constant-current charge is carried out at 0.1 C rate of current until the cell voltage becomes 4.3 V; subsequently, constant-voltage charge is carried out under a current condition of maintaining the cell voltage at 4.3 V, until the current drops to 1/20, followed by 10 minutes rest; and then, constant-current discharge is carried out at 0.1 C rate of current until the cell voltage becomes 3.0 V, followed by 10 minutes rest. A total of two cycles were performed under a condition of 25° C., and the discharge capacity as measured in the second cycle was employed as "discharge capacity at 0.1 C rate of current."

Subsequently, constant-current charge was carried out at 0.1 C rate of current, and two cycles of constant-current discharge were carried out at 1 C rate of current. The discharge capacity as measured in the second cycle was employed as "discharge capacity at 1 C rate of current." Rate characteristic was evaluated on the basis of a value obtained by dividing the "discharge capacity at 1 C rate of current" by the "discharge capacity at 0.1 C rate of current" (actually in terms of percentage of the value; i.e., "percent rate capacity maintenance (%)").

(4-2) Cycle Characteristic

The fabricated cell was subjected to cyclic charge-discharge at a test temperature of 25° C. The cyclic charge-discharge repeats: (1) charge at 1 C rate of constant current and constant voltage until 4.3 V is reached, and (2) discharge at 1 C rate of constant current until 3.0 V is reached. Cycle characteristic was evaluated on the basis of a value obtained by dividing the discharge capacity of the cell as measured after 100 repetitions of cyclic charge-discharge by the initial discharge capacity of the cell (actually in terms of percentage of the value; i.e., "percent cycle capacity maintenance (%)").

4-3. Evaluation Results

Next will be described the evaluation results of samples of Experimental Examples 1 to 5 and Comparative Examples 1 to 5 produced under appropriately modified production conditions as shown below in Table 1.

TABLE 1

| | Li/M | Pulverization-mixing time (h) | Forming rate (m/s) | Mesh (μm) | Lithium incorporation temperature (° C.) |
|---|---|---|---|---|---|
| Comp. Ex. 1 | 1.1 | 16 | 0.2 | 50 | 775 |
| Exp. Ex. 1 | 1.1 | 16 | 0.7 | 50 | 775 |
| Exp. Ex. 2 | 1.1 | 16 | 1 | 50 | 775 |
| Exp. Ex. 3 | 1.1 | 20 | 6 | 50 | 775 |
| Comp. Ex. 2 | 1.1 | 24 | 10 | 50 | 775 |
| Comp. Ex. 3 | 1.05 | 16 | 1 | 50 | 725 |
| Exp. Ex. 4 | 1.1 | 16 | 1 | 50 | 800 |
| Comp. Ex. 4 | 1.2 | 16 | 1 | 50 | 800 |
| Comp. Ex. 5 | 1.1 | 4 | 1 | 50 | 775 |
| Exp. Ex. 5 | 1.1 | 8 | 1 | 50 | 775 |
| Exp. Ex. 6 | 1.1 | 16 | 0.7 | 30 | 775 |
| Exp. Ex. 7 | 1.1 | 16 | 1 | 30 | 775 |
| Exp. Ex. 8 | 1.1 | 16 | 1 | 30 | 800 |

TABLE 2

| | Thickness (μm) | Aspect ratio | Orientation degree | Primary grain size (μm) | Dispersed state Plate surface | Dispersed state Cross-sectional surface |
|---|---|---|---|---|---|---|
| Comp. Ex. 1 | 10 | 5 | 5 | 0.8 | 7 | 9 |
| Exp. Ex. 1 | 10 | 5 | 15 | 0.8 | 7 | 8 |
| Exp. Ex. 2 | 10 | 5 | 50 | 0.8 | 5 | 5 |
| Exp. Ex. 3 | 10 | 5 | 90 | 0.8 | 4 | 5 |
| Comp. Ex. 2 | 10 | 5 | 110 | 0.8 | 5 | 4 |
| Comp. Ex. 3 | 10 | 5 | 50 | 0.08 | 7 | 6 |
| Exp. Ex. 4 | 10 | 5 | 50 | 3 | 7 | 8 |
| Comp. Ex. 4 | 10 | 5 | 50 | 7 | 6 | 7 |
| Comp. Ex. 5 | 10 | 5 | 35 | 0.8 | 17 | 20 |
| Exp. Ex. 5 | 10 | 5 | 45 | 0.8 | 12 | 13 |
| Exp. Ex. 6 | 10 | 2.8 | 15 | 0.8 | 7 | 7 |
| Exp. Ex. 7 | 10 | 2.8 | 50 | 0.8 | 6 | 7 |
| Exp. Ex. 8 | 10 | 2.8 | 50 | 3 | 8 | 8 |

TABLE 3

| | Rate characteristic (%) 1 C/0.1 C | Cycle characteristic (%) 100 cycles/1 cycle |
|---|---|---|
| Comp. Ex. 1 | 93 | 87 |
| Exp. Ex. 1 | 94 | 95 |
| Exp. Ex. 2 | 93 | 97 |
| Exp. Ex. 3 | 92 | 98 |
| Comp. Ex. 2 | 79 | 98 |
| Comp. Ex. 3 | 83 | 96 |
| Exp. Ex. 4 | 91 | 95 |
| Comp. Ex. 4 | 82 | 93 |
| Comp. Ex. 5 | 84 | 95 |
| Exp. Ex. 5 | 89 | 96 |
| Exp. Ex. 6 | 96 | 94 |
| Exp. Ex. 7 | 95 | 96 |
| Exp. Ex. 8 | 93 | 97 |

In Table 1, "Li/M" corresponds to the ratio by mole of lithium to transition metal elements upon mixing of a lithium compound with transition metal compounds in the slurry preparation step of the aforementioned example. Specifically, a ratio "Li/M" of 1.1 corresponds to the case where a lithium compound is mixed with transition metal compounds so as to attain a composition of $Li_{1.1}(Ni_{0.75}Co_{0.2}Al_{0.05})O_2$ (see the aforementioned example).

"Pulverization-mixing time" corresponds to the time of treatment of a mixture of a lithium compound and transition metal compounds by means of a ball mill in the slurry preparation step of the aforementioned example. "Forming rate" corresponds to the "feed rate" employed in the sheet forming step of the aforementioned example. "Mesh" corresponds to mesh opening size in the crushing step of the Experimental Examples (the aspect ratio can be controlled by varying the mesh opening size). "Lithium incorporation temperature" corresponds to the thermal treatment temperature employed in the thermal treatment step of the aforementioned example.

In Table 2, "orientation degree" corresponds to the peak intensity ratio [003]/[104]. "Dispersed state" corresponds to the aforementioned standard deviation as determined through observation of plate surfaces or cross-sectional surfaces.

Referring to Tables 1 to 3, when orientation degree was changed by regulating the pulverization-mixing time and the forming rate (Experimental Examples 1 to 3 and Comparative Examples 1 and 2), cycle characteristic was lowered in Comparative Example 1 (very low peak intensity ratio [003]/[104]), and rate characteristic was lowered in Comparative Example 2 (very high peak intensity ratio [003]/[104]). In contrast, in Experimental Examples 1 to 3 (preferred range of peak intensity ratio [003]/[104]), favorable rate characteristic and cycle characteristic were attained.

Next will be described the results obtained by changing primary grain size in the Experimental Examples which have compositions of $Li_{1.0}(Ni_{0.75}Co_{0.2}Al_{0.05})O_2$ through regulation of the ratio by mole of a lithium compound to transition metal compounds (i.e., Li/M) in the slurry preparation step, and the thermal treatment temperature (lithium incorporation temperature).

In Comparative Example 3 (smallest primary grain size), rate characteristic was slightly lowered. Conceivably, the reason for this is attributed to inhibition of diffusion of lithium ions due to an increase in amount of crystal grain boundaries in cathode active material particles associated with a reduction in primary grain size. In Comparative Example 3, the primary grain size (0.08 μm) is less than 1/100 of the thickness (10 μm) of the cathode active material particles.

In Comparative Example 4 (largest primary grain size in compositions of $Li_{1.0}(Ni_{0.75}Co_{0.2}Al_{0.05})O_2$: 7 μm), rate characteristic and cycle characteristic were slightly lowered. Conceivably, the reason for this is attributed to the fact that, in association with an increase in primary grain size, the aforementioned effect of improving cycle characteristic by reduction of internal stress is slightly lowered, and diffusion of lithium ions is slightly inhibited due to a very large distance between lithium-intercalation/deintercalation-plane-oriented grains 22a2 (see FIG. 2B).

In the case where the degree of dispersion of lithium-intercalation/deintercalation-plane-oriented grains 22a2 (see FIG. 2B) was changed through regulation of the pulverization-mixing time, when the standard deviation was 15 or less (more preferably 10 or less), favorable rate characteristic was attained. Conceivably, the reason for this is attributed to the fact that when lithium-intercalation/deintercalation-plane-oriented grains 22a2 are dispersed more uniformly, intercalation and deintercalation of lithium ions are more effectively promoted at the surfaces of the cathode active material particles.

The thickness and aspect ratio of the cathode active material particles can be readily controlled by appropriately modifying production conditions; for example, forming conditions (thickness after drying) in the aforementioned sheet forming step, or crushing conditions (mesh opening size) in the crushing step (see Experimental Examples 6 to 8 with respect to aspect ratios of 2.8).

Furthermore, examples having compositions of $Li_{1.0}(Ni_{0.85}Co_{0.1}Al_{0.05})O_2$ were reviewed. Those results are shown in Tables 4 to 6.

TABLE 4

| | Li/M | Pulverization-mixing time (h) | Forming rate (m/s) | Mesh (μm) | Lithium incorporation temperature (° C.) |
|---|---|---|---|---|---|
| Comp. Ex. 6 | 1.1 | 16 | 0.2 | 35 | 775 |
| Exp. Ex. 9 | 1.1 | 16 | 0.7 | 35 | 775 |
| Exp. Ex. 10 | 1.1 | 16 | 1 | 35 | 775 |
| Exp. Ex. 11 | 1.1 | 20 | 6 | 35 | 775 |
| Comp. Ex. 7 | 1.1 | 24 | 10 | 35 | 775 |
| Comp. Ex. 8 | 1.05 | 16 | 1 | 35 | 725 |
| Exp. Ex. 12 | 1.1 | 16 | 1 | 35 | 800 |
| Exp. Ex. 13 | 1.2 | 16 | 1 | 35 | 815 |
| Comp. Ex. 9 | 1.25 | 16 | 1 | 35 | 830 |
| Comp. Ex. 10 | 1.1 | 4 | 1 | 35 | 775 |
| Exp. Ex. 14 | 1.1 | 8 | 1 | 35 | 775 |
| Exp. Ex. 15 | 1.1 | 16 | 0.7 | 50 | 775 |
| Exp. Ex. 16 | 1.1 | 16 | 1 | 50 | 775 |
| Exp. Ex. 17 | 1.1 | 16 | 1 | 50 | 800 |

TABLE 5

| | Thickness (μm) | Aspect ratio | Orientation degree | Primary grain size (μm) | Dispersed state Plate surface | Dispersed state Cross-sectional surface |
|---|---|---|---|---|---|---|
| Comp. Ex. 6 | 10 | 3 | 5 | 1 | 8 | 7 |
| Exp. Ex. 9 | 10 | 3 | 20 | 1 | 7 | 6 |
| Exp. Ex. 10 | 10 | 3 | 50 | 1 | 6 | 5 |
| Exp. Ex. 11 | 10 | 3 | 90 | 1 | 5 | 4 |
| Comp. Ex. 7 | 10 | 3 | 110 | 1 | 5 | 5 |
| Comp. Ex. 8 | 10 | 3 | 50 | 0.07 | 7 | 8 |
| Exp. Ex. 12 | 10 | 3 | 50 | 4 | 7 | 7 |
| Exp. Ex. 13 | 10 | 3 | 50 | 9 | 6 | 7 |
| Comp. Ex. 9 | 10 | 3 | 50 | 11 | 8 | 7 |
| Comp. Ex. 10 | 10 | 3 | 35 | 1 | 19 | 17 |
| Exp. Ex. 14 | 10 | 3 | 45 | 1 | 13 | 11 |
| Exp. Ex. 15 | 10 | 5 | 20 | 1 | 6 | 7 |
| Exp. Ex. 16 | 10 | 5 | 50 | 1 | 7 | 6 |
| Exp. Ex. 17 | 10 | 5 | 50 | 4 | 7 | 8 |

TABLE 6

|  | Rate characteristic (%) 1 C/0.1 C | Cycle characteristic (%) 100 cycles/1 cycle |
|---|---|---|
| Comp. Ex. 6 | 92 | 85 |
| Exp. Ex. 9 | 94 | 94 |
| Exp. Ex. 10 | 93 | 96 |
| Exp. Ex. 11 | 93 | 98 |
| Comp. Ex. 7 | 77 | 98 |
| Comp. Ex. 8 | 82 | 96 |
| Exp. Ex. 12 | 91 | 96 |
| Exp. Ex. 13 | 90 | 93 |
| Comp. Ex. 9 | 83 | 91 |
| Comp. Ex. 10 | 81 | 94 |
| Exp. Ex. 14 | 89 | 94 |
| Exp. Ex. 15 | 93 | 95 |
| Exp. Ex. 16 | 93 | 97 |
| Exp. Ex. 17 | 90 | 98 |

As shown in Tables 4 to 6, the result of examples having compositions of $Li_{1.0}(Ni_{0.85}Co_{0.1}Al_{0.05})O_2$ were comparable to those of compositions of $Li_{1.0}(Ni_{0.75}Co_{0.2}Al_{0.05})O_2$. Especially, good handling ability was achieved in 2 to 5 (3 to 5) of an aspect ratio by both compositions. Note that, in the composition of $Li_{1.0}(Ni_{0.85}Co_{0.1}Al_{0.05})O_2$, Experimental Example 13 (primary grain size of 9 μm) showed excellent rate and cycle characteristics but Comparative Example 9 (primary grain size of 11 μm) showed slightly-decreased rate characteristic. That is, a proper range of primary grain size is extended to larger side by increase of Ni proportion in the composition. The reason is now under investigation, but seems that diffusivity of Lithium ion in the grain is enhanced by increase of Ni proportion in the composition.

5. Examples of Modifications

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The composition of the cathode active material plate-like particle of the present invention is not limited to that described above, so long as the particle has a layered rock salt structure. For example, the cathode active material plate-like particle of the present invention may have any of the following compositions: lithium nickelate, lithium manganate, lithium nickel manganate, lithium nickel cobaltate, lithium cobalt nickel manganate, lithium cobalt manganate, etc. These materials may contain one or more elements of, for example, Mg, Al, Si, Ca, Ti, V, Cr, Fe, Cu, Zn, Ga, Ge, Sr, Y, Zr, Nb, Mo, Ag, Sn, Sb, Te, Ba, and Bi.

The electrolyte employed in the present invention may be a gel polymer electrolyte.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

What is claimed is:

1. A cathode active material plate-like particle for a lithium secondary battery, the particle being in a polycrystalline form composed of numerous primary crystal grains having a layered rock salt structure, comprising:

when t represents the thickness of the particle, d represents the size of the particle as measured in a direction orthogonal to the thickness direction which defines the thickness, and d/t represents an aspect ratio, the following relations: $t \leq 30$ μm and $d/t \geq 2$ are satisfied;

lithium-intercalation-deintercalation-plane-oriented grains, which are primary crystal grains whose (003) plane is oriented so as to intersect a plate surface of the plate-like particle, are present in a dispersed state among numerous (003)-plane-oriented grains, which are primary crystal grains whose (003) plane is oriented in parallel with the plate surface of the plate-like particle; and the peak intensity ratio [003]/[104], which is the ratio of intensity of diffraction by the (003) plane to intensity of diffraction by the (104) plane, as obtained through X-ray diffractometry, is 10 to 100.

2. A cathode active material plate-like particle for a lithium secondary battery according to claim 1, wherein, when the proportion of lithium-intercalation-deintercalation-plane-oriented grains at the plate surface of the plate-like particle is determined in 10 visual fields, each containing 100 to 200 primary crystal grains, by means of an electron backscatter diffractometer, the standard deviation of the thus-determined proportions is 15 or less.

3. A cathode active material plate-like particle for a lithium secondary battery according to claim 1, wherein, when the proportion of lithium-intercalation-deintercalation-plane-oriented grains at a cross section orthogonal to the plate surface of the plate-like particle is determined in 10 visual fields, each containing 100 to 200 primary crystal grains, by means of an electron backscatter diffractometer, the standard deviation of the thus-determined proportions is 15 or less.

4. A cathode active material plate-like particle for a lithium secondary battery according to claim 2, wherein, when the proportion of lithium-intercalation-deintercalation-plane-oriented grains at a cross section orthogonal to the plate surface of the plate-like particle is determined in 10 visual fields, each containing 100 to 200 primary crystal grains, by means of an electron backscatter diffractometer, the standard deviation of the thus-determined proportions is 15 or less.

5. A cathode active material plate-like particle for a lithium secondary battery according to claim 1, wherein the primary crystal grains have a grain size of t/100 or more and 5 μm or less.

6. A cathode active material plate-like particle for a lithium secondary battery according to claim 2, wherein the primary crystal grains have a grain size of t/100 or more and 5 μm or less.

7. A cathode active material plate-like particle for a lithium secondary battery according to claim 3, wherein the primary crystal grains have a grain size of t/100 or more and 5 μm or less.

8. A cathode active material plate-like particle for a lithium secondary battery according to claim 4, wherein the primary crystal grains have a grain size of t/100 or more and 5 μm or less.

9. A cathode active material plate-like particle for a lithium secondary battery according to claim 1, wherein the material has a composition represented by the following formula:

$$Li_p(Ni_x, Co_y, M_z)O_2$$

wherein M is at least one species selected from the group consisting of Al, Mn, and Mg; $0.9 \leq p \leq 1.3$; $0.6 < x \leq 0.95$; $0.01 < y \leq 0.3$; $0 \leq z \leq 0.2$; and $x+y+z=1$.

10. A cathode active material plate-like particle for a lithium secondary battery according to claim 2, wherein the material has a composition represented by the following formula:

$$Li_p(Ni_x, Co_y, M_z)O_2$$

wherein M is at least one species selected from the group consisting of Al, Mn, and Mg; $0.9 \leq p \leq 1.3$; $0.6 < x \leq 0.95$; $0.01 < y \leq 0.3$; $0 \leq z \leq 0.2$; and $x+y+z=1$.

11. A cathode active material plate-like particle for a lithium secondary battery according to claim 3, wherein the material has a composition represented by the following formula:

$$Li_p(Ni_x, Co_y, M_z)O_2$$

wherein M is at least one species selected from the group consisting of Al, Mn, and Mg; $0.9 \leq p \leq 1.3$; $0.6 < x \leq 0.95$; $0.01 < y \leq 0.3$; $0 \leq z \leq 0.2$; and $x+y+z=1$.

12. A cathode active material plate-like particle for a lithium secondary battery according to claim 4, wherein the material has a composition represented by the following formula:

$$Li_p(Ni_x, Co_y, M_z)O_2$$

wherein M is at least one species selected from the group consisting of Al, Mn, and Mg; $0.9 \leq p \leq 1.3$; $0.6 < x \leq 0.95$; $0.01 < y \leq 0.3$; $0 \leq z \leq 0.2$; and $x+y+z=1$.

13. A cathode active material plate-like particle for a lithium secondary battery according to claim 10, wherein M in the formula is Al.

14. A cathode active material plate-like particle for a lithium secondary battery according to claim 9, wherein M in the formula is Al.

* * * * *